(12) United States Patent
Cunningham

(10) Patent No.: US 7,766,542 B2
(45) Date of Patent: Aug. 3, 2010

(54) APPARATUS, SYSTEM, AND METHOD FOR DETERMINING A CATALYST BED TEMPERATURE

(75) Inventor: Michael J. Cunningham, Greenwood, IN (US)

(73) Assignee: Cummins IP, Inc, Minneapolis, MN (US)

( * ) Notice: Subject to any disclaimer, the term of this patent is extended or adjusted under 35 U.S.C. 154(b) by 542 days.

(21) Appl. No.: 11/619,152

(22) Filed: Jan. 2, 2007

(65) Prior Publication Data
US 2008/0156075 A1    Jul. 3, 2008

(51) Int. Cl.
*G01K 17/00* (2006.01)
*G01K 3/10* (2006.01)

(52) U.S. Cl. ............... 374/141; 374/35; 374/104; 374/144; 60/272; 701/101; 429/12

(58) Field of Classification Search ............... 73/23.25, 73/23.26, 23.31, 25.01, 25.03, 114.01, 114.38, 73/114.69, 114.75; 374/29–36, 43, 100, 374/40, 135, 141, 143, 147, 163, 183; 422/211, 422/222, 192, 198; 429/12, 13, 23, 24, 25, 429/20, 17, 19, 26; 128/201.21, 200.24, 128/201.27; 60/597, 285, 272, 279, 299, 60/295, 302, 311, 274, 276; 701/101–105, 701/108
See application file for complete search history.

(56) References Cited

U.S. PATENT DOCUMENTS

| | | | | |
|---|---|---|---|---|
| 4,002,150 A | * | 1/1977 | Shinohara et al. | ............... 123/3 |
| 5,484,576 A | * | 1/1996 | Langer et al. | ............... 422/211 |
| 5,603,215 A | * | 2/1997 | Sung et al. | ............... 60/274 |
| 6,276,128 B1 | | 8/2001 | Kammann et al. | ............... 60/274 |
| 6,295,806 B1 | | 10/2001 | Poublon et al. | ............... 60/274 |
| 6,347,627 B1 | * | 2/2002 | Frankie et al. | ......... 128/201.21 |
| 6,436,561 B1 | * | 8/2002 | Hart-Predmore et al. | ...... 429/12 |
| 6,523,341 B1 | | 2/2003 | Rumpusa et al. | ............... 60/277 |
| 6,601,382 B2 | | 8/2003 | Nader et al. | ............... 60/274 |
| 6,619,108 B2 | | 9/2003 | Birkhofer et al. | ........... 73/118.1 |

(Continued)

FOREIGN PATENT DOCUMENTS

EP    1108124 B1    4/2003

*Primary Examiner*—Gail Verbitsky
(74) *Attorney, Agent, or Firm*—Kunzler Needham Massey & Thorpe

(57) ABSTRACT

An apparatus, system, and method are disclosed for determining a catalyst bed temperature. The method may include receiving a current fluid mass flow within an exhaust pipe and a total amount of unburned fuel available for catalytic combustion. The method may further include determining a plurality of fluid enthalpy values corresponding to various locations within the exhaust pipe. The method may continue with calculating an amount of fuel burned on an upstream catalyst based on the plurality of fluid enthalpy values, and determining an amount of fuel remaining that is available for combustion on a downstream catalyst. The method may determine a combustion efficiency of the downstream catalyst based on the temperature rise across the downstream catalyst, and an amount of heat generated within the downstream catalyst based on the combustion efficiency and the amount of fuel remaining that is available for combustion on the downstream catalyst. The method may conclude with determining a downstream catalyst bed temperature based on the net heat generation, the fluid mass flow through the downstream catalyst, and the thermal response of the downstream catalyst.

18 Claims, 9 Drawing Sheets

U.S. PATENT DOCUMENTS

| | | | |
|---|---|---|---|
| 6,821,501 B2* | 11/2004 | Matzakos et al. | 423/652 |
| 6,964,194 B2 | 11/2005 | Busch et al. | 73/118.1 |
| 7,055,311 B2* | 6/2006 | Beutel et al. | 60/285 |
| 7,063,642 B1* | 6/2006 | Hu et al. | 477/100 |
| 2003/0068260 A1* | 4/2003 | Wellington et al. | 422/192 |
| 2004/0034266 A1* | 2/2004 | Brophy et al. | 585/658 |
| 2005/0044843 A1 | 3/2005 | Price | 60/285 |
| 2006/0199051 A1* | 9/2006 | Bai et al. | 429/17 |
| 2007/0033928 A1* | 2/2007 | Hu et al. | 60/286 |
| 2008/0022660 A1* | 1/2008 | Reuter et al. | 60/286 |
| 2008/0148709 A1* | 6/2008 | Miller et al. | 60/274 |
| 2008/0148735 A1* | 6/2008 | McGehee | 60/689 |
| 2008/0196392 A1* | 8/2008 | Stroia et al. | 60/285 |
| 2009/0004076 A1* | 1/2009 | Brophy et al. | 422/222 |
| 2009/0064668 A1* | 3/2009 | Herrick et al. | 60/295 |

* cited by examiner

APPARATUS, SYSTEM, AND METHOD FOR DETERMINING A CATALYST BED TEMPERATURE

BACKGROUND OF THE INVENTION

1. Field of the Invention

This invention relates to engine aftertreatment systems and more particularly relates to apparatus, systems and methods for determining catalyst bed temperatures in engine aftertreatment systems designed to experience high temperature events.

2. Description of the Related Art

Environmental concerns have motivated the implementation of emission requirements for internal combustion engines throughout much of the world. Governmental agencies, such as the Environmental Protection Agency (EPA) in the United States, carefully monitor the emission quality of engines and set acceptable emission standards, to which all engines must comply. Generally, emission requirements vary according to engine type. Emission tests for compression-ignition (diesel) engines typically monitor the release of diesel particulate matter (PM), nitrogen oxides ($NO_x$), and unburned hydrocarbons (UHC). Catalytic converters implemented in an exhaust gas after-treatment system have been used to eliminate many of the pollutants present in exhaust gas.

Many catalytic systems used in engine aftertreatment require periodic high temperature events to maintain the system. For example, a catalytic soot filter may require periodic regeneration events at a high temperature to oxidize soot from the filter. A catalytic system to adsorb $NO_x$ may require high temperature events to drive adsorbed NOx off of the catalytic substrate. Some catalysts adsorb sulfur oxides ($SO_x$) during operation, and require very high temperature events to drive the $SO_x$ back off of the catalyst.

A catalytic component that reaches temperatures that are too high may experience degradation or failure. The catalyst can be degraded, the component may crack from thermal stresses, or the oxidation of soot may occur too quickly and cause a thermal event. In some cases, the temperature required to achieve a successful regeneration event may be close to the temperature which causes component failure. Thus, an accurate estimate of the physical catalyst bed temperature is required, or component operation and reliability may be jeopardized.

In the current art, an accurate estimate of the physical catalyst bed is difficult to achieve. Available temperature sensors have slow response times and cannot be easily embedded within the catalyst bed. In one example indicative of the current art, a temperature sensor is placed in each location, upstream and downstream, of the catalyst bed and a weighted average between the two sensors is used to estimate the catalyst bed temperature. The temperature may be offset by a temperature (e.g. +50 degrees Celsius) to account for the observation that internal bed temperatures may often be higher than either the upstream or downstream temperature sensor reading. This setup requires either significant risk to the component, or a conservative temperature offset which decreases system efficiency and fuel economy, and may introduce a risk that regeneration is estimated to be successful when in fact regeneration is not achieved.

A full heat transfer and energy balance model, combined with inputs from the engine conditions, could be developed. However, such a model requires significant knowledge of the system that may not easily be available (e.g. the reflectivity of the exhaust pipe and the engine block to estimate radiation), that may vary considerably within applications in ways that cannot be understood at the design time of the model, and that require computing power far beyond the typical computing capabilities that are generally commercially available for engine controls.

From the foregoing discussion, it should be apparent that a need exists for an apparatus, system, and method for determining a catalyst bed temperature that achieves sufficient accuracy to achieve regenerations within a catalytic component without reaching component failure temperatures. Beneficially, such an apparatus, system, and method, would enable estimating the catalyst bed temperature with generally available sensors, system parameters, and computing power.

SUMMARY OF THE INVENTION

The present invention has been developed in response to the present state of the art, and in particular, in response to the problems and needs in the art that have not yet been fully solved by currently available sensor-based control systems wherein the reliability of the sensor response is questionable under defined conditions. Accordingly, the present invention has been developed to provide an apparatus, system, and method for providing system feedback from combined input values that overcome many or all of the above-discussed shortcomings in the art.

An apparatus is disclosed comprising a plurality of modules configured to execute the determination a catalyst bed temperature. The modules include a mass flow module, an energy balance module, a fueling module, a catalyst combustion module, a peak temperature module, and a bed temperature module. The apparatus may further include a catalyst efficiency module.

The mass flow module may be configured to interpret a fluid mass flow within an exhaust fluid conduit. The energy balance module may be configured to determine a plurality of fluid enthalpy values corresponding to a plurality of axial locations within the exhaust fluid conduit. The fueling module may be configured to interpret a total catalyst fuel available. The catalyst combustion module may be configured to calculate a net heat generation within a catalytic component based on the plurality of fluid enthalpy values and the total catalyst fuel available. The peak temperature module may be configured to determine a thermal driving force based on the net heat generation.

The bed temperature module may be configured to calculate a bed temperature based on the thermal driving force, a previous bed temperature, and the catalytic component thermal response. The thermal driving force may comprise a steady-state temperature, and the bed temperature module may be further configured to interpret the catalytic component thermal response as a filter time constant, and to operate a first-order filter to calculate a current bed temperature based on the steady-state temperature, the previous bed temperature, and the filter time constant.

The catalyst efficiency module may be configured to determine a catalyst fuel combustion efficiency based on the temperature rise across a first catalytic component, and the catalyst combustion module may be further configured to calculate the net heat generation based on the catalyst fuel combustion efficiency. The catalyst efficiency module may be further configured to determine the catalyst fuel combustion efficiency based on a derivative of the temperature rise across the first catalytic component with respect to time.

The catalytic component may comprise a first catalytic component, and the apparatus may further comprise a second catalytic component upstream of the first catalytic component. In one embodiment, the plurality of axial locations comprise a first axial location upstream of the second catalytic component, a second axial location downstream of the second catalytic component, and a third axial location upstream of the first catalytic component. The first catalytic component may comprise a $NO_x$ adsorption catalyst, and the second catalytic component may comprise a diesel oxidation catalyst.

The catalyst efficiency module may be configured to determine a first catalyst fuel combustion efficiency based on the temperature rise across the first catalytic component, and to calculate the net heat generation based on the first catalyst fuel combustion efficiency. The catalyst efficiency module may be further configured to determine the first catalyst fuel combustion efficiency based on a derivative of the temperature rise across the first catalytic component with respect to time. The catalyst combustion module may be further configured to determine a second catalyst combustion efficiency based on the second and third fluid enthalpy values, to calculate an intermediate catalyst fuel available based on the total catalyst fuel available and the second catalyst combustion efficiency, and to calculate the net heat generation based on the intermediate catalyst fuel available. The catalyst combustion module may be further configured to determine the second catalyst combustion efficiency based on a second catalytic component ambient heat loss factor.

A method is disclosed, which may be implemented as operations of a computer program product, where the method comprises interpreting a fluid mass flow within an exhaust fluid conduit. The method may further comprise determining a plurality of fluid enthalpy values corresponding to a plurality of axial locations within the exhaust fluid conduit, interpreting a total catalyst fuel available, and calculating a net heat generation within a first catalytic component based on the plurality of fluid enthalpy values and the total catalyst fuel available. The method may further comprise determining a thermal driving force based on the net heat generation, and calculating a bed temperature based on the thermal driving force, a previous bed temperature, and a first catalytic component thermal response.

The method may comprise determining a first catalyst fuel combustion efficiency based on the temperature rise across the first catalytic component, and calculating the net heat generation based on the first catalyst fuel combustion efficiency. In one embodiment, the method may further comprise determining the first catalyst fuel combustion efficiency based on a derivative of the temperature rise across the first catalytic component with respect to time. The method may further comprise determining a second catalyst combustion efficiency based on a second fluid enthalpy value and a third fluid, calculating an intermediate catalyst fuel available based on the total catalyst fuel available and the second catalyst combustion efficiency, and calculating the net heat generation based on the intermediate catalyst fuel available. The method may further comprise determining the second catalyst combustion efficiency based on a second catalytic component ambient heat loss factor. In one embodiment, the thermal driving force may comprise a steady-state temperature, and the method may further comprise interpreting the first catalytic component thermal response as a filter time constant and operating a first-order filter to calculate a current bed temperature based on the steady-state temperature, the previous bed temperature, and the filter time constant.

A method is disclosed for determining a catalyst bed temperature. The method may include interpreting a fluid mass flow within an exhaust fluid conduit, and interpreting a total catalyst fuel available. The method may further comprise determining a plurality of fluid enthalpy values, each fluid enthalpy value corresponding to one of the following axial locations within the exhaust fluid conduit: upstream of a diesel oxidation catalyst, downstream of the diesel oxidation catalyst, upstream of a $NO_x$-adsorption catalyst, and downstream of a NOx-adsorption catalyst.

In one embodiment, the method may include calculating a net heat generation within the NOx-adsorption catalyst based on the plurality of fluid enthalpy values by determining a combustion efficiency for the diesel oxidation catalyst based on the fluid enthalpy values upstream and downstream of the diesel oxidation catalyst, calculating an intermediate catalyst fuel available based on the total catalyst fuel available and the combustion efficiency for the diesel oxidation catalyst, and calculating the net heat generation based on the intermediate catalyst fuel available. The method may include determining a steady state temperature of the NOx-adsorption catalyst bed based on the net heat generation within the NOx-adsorption catalyst, and calculating a NOx-adsorption catalyst bed temperature based on the steady state temperature, a previous bed temperature, and the NOx-adsorption catalyst thermal response.

The method may include determining a combustion efficiency for the diesel oxidation catalyst by interpreting an enthalpy rise across the diesel oxidation catalyst, determining a fuel quantity required to induce the enthalpy rise, and comparing the fuel quantity to the total catalyst fuel available. In one embodiment, the method further comprises calculating the net heat generation based on the intermediate catalyst fuel available comprises determining a catalyst fuel combustion efficiency, wherein the catalyst fuel combustion efficiency comprises a function of the temperature rise across the NOx-adsorption catalyst, and a derivative of the temperature rise across the NOx-adsorption catalyst.

An engine aftertreatment system is disclosed comprising an internal combustion engine, and at least one catalyst fuel provider. The system may further include an exhaust fluid conduit configured to vent the engine exhaust, and at least one catalytic component configured to treat the engine exhaust. The system may further comprise a controller. The controller may include an apparatus comprising a plurality of modules configured to execute the determination a catalyst bed temperature. The modules include a mass flow module, an energy balance module, a fueling module, a catalyst combustion module, a peak temperature module, and a bed temperature module. The controller may further include a catalyst efficiency module.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention enables the estimation of the bed temperature of a catalytic component for the purposes of bed temperature control. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
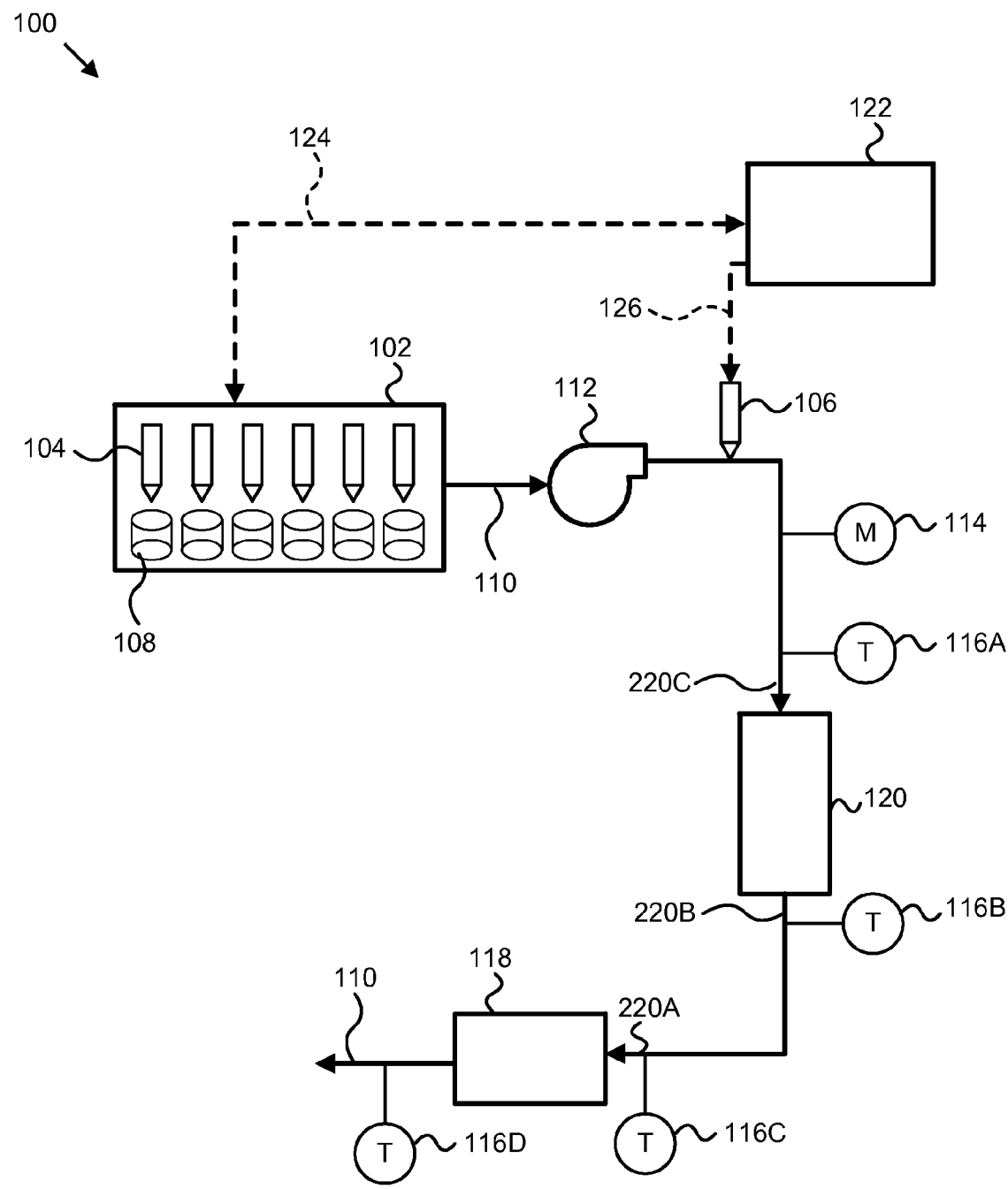
FIG. 1 is a schematic block diagram illustrating one embodiment of system for estimating a catalyst bed temperature in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of system 100 for estimating a catalyst bed temperature in accordance with the present invention. The system 100 may be an engine aftertreatment system including an internal combustion engine 102 providing an engine exhaust as a byproduct of operation. The system 100 may further include at least one catalyst fuel provider 104, 106. One catalyst fuel provider may be a fuel injector 104 configured to inject fuel within the engine 102 cylinder 108 such that the fuel is not combusted within the cylinder 108 but rather is expelled unburned to an exhaust fluid conduit 110 and available as catalyst fuel. Another catalyst fuel provider may be a dosing injector 106 configured to inject fuel into the exhaust fluid conduit 110 and thereby make fuel available as catalyst fuel.

The system 100 may further include the exhaust fluid conduit 110 configured to vent the engine exhaust. The exhaust fluid conduit 110 may include a turbocharger 112, a mass flow sensor 114, and various temperature sensors 116. The mass flow sensor 114 may be a mass flow sensor 114 installed in the exhaust fluid conduit 110, a mass flow sensor 114 installed in a fluid intake conduit (not shown), or a virtual mass flow sensor 114 configured to estimate the fluid mass flow through the exhaust fluid conduit 110 based on various engine 102 operating parameters, such as engine speed, fueling, timing, turbocharger 112 speed, ambient temperature and pressure, and engine 102 output temperature. Various virtual mass flow sensors 114 are known in the art.

The various temperature sensors 116A-116D may comprise physical temperature sensors such as thermistors or thermocouples, and/or virtual temperature sensors 116 wherein the temperatures at a given point in the system 100 are estimated from various engine 102 operating parameters. The temperature sensor 116 locations shown in FIG. 1 are illustrative only, and one or more of the indicated temperature sensors 116 may not be in a given embodiment of the system 100, while other embodiments of the system 100 may include temperature sensors 116 in other locations. The temperature sensors 116 included to practice a given embodiment of the system 100 will be evident to one of skill in the art based upon the disclosures herein.

The system 100 may include a first catalytic component 118 configured to treat the engine 102 exhaust. The first catalytic component may be a $NO_x$ adsorption catalyst (NAC) 118 configured to burn remaining catalyst fuel and to adsorb NO and/or $NO_2$ within the exhaust during a $NO_x$ capture cycle. The NAC 118 may be further configured to reduce the $NO_x$ to $N_2$ and/or $N_2O$ while releasing it in a $NO_x$ reduction cycle. The system 100 may further include a second catalytic component 120 configured to treat the engine exhaust. The second catalytic component 120 may be a diesel oxidation catalyst (DOC) 118 configured to burn catalyst fuel and generate temperature. The DOC and/or the NAC may be further configured to release bound sulfur oxides that would poison the catalysts 118, 120 in a high temperature $SO_x$ removal cycle.

The system 100 may further include a controller 122. The controller 122 may include various modules configured to execute the determination of a catalyst bed temperature. In one embodiment, the catalyst bed temperature is the temperature within the bulk of the first catalytic component 118. The controller 122 may communicate 124 with the engine 102 to send commands and receive data from the engine 102, and the controller 122 may communicate 126 with the dosing injector 106 to send commands and receive data. The controller 122 may further communicate with and provide commands to any component or device within the system 100. Such communications and commands may be electronic, pneumatic, or datalink communications as is known in the art.

Figure 2:
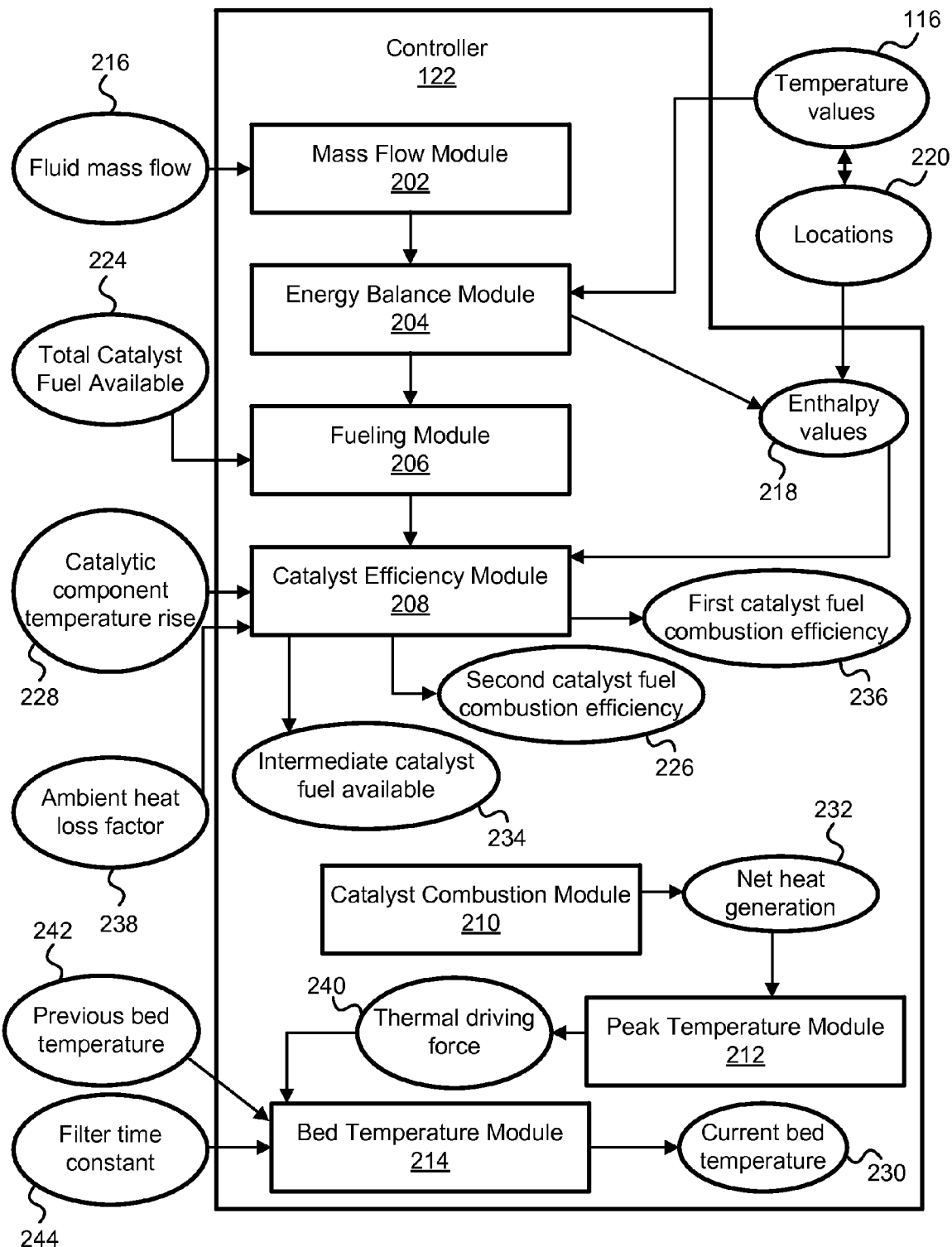
FIG. 2 is a schematic block diagram illustrating one embodiment of a controller in accordance with the present invention.

FIG. 2 is a schematic block diagram illustrating one embodiment of a controller 122 in accordance with the present invention. The controller 122 may include various modules configured to execute the determination of a catalyst bed temperature. In one embodiment, the controller 122 may include a mass flow module 202, an energy balance module 204, a fueling module 206, a catalyst efficiency module 208, a catalyst combustion module 210, a peak temperature module 212, and a bed temperature module 214.

The mass flow module 202 may be configured to interpret a fluid mass flow 216 within the exhaust fluid conduit 110. Interpreting the fluid mass flow 216 may comprise reading a value from a mass flow sensor 114 over a datalink and/or electronically, or executing a mass flow virtual sensor 114 to determine the fluid mass flow 216 based on parameters communicated 124 from an engine 102. In one embodiment, interpreting the fluid mass flow 216 comprises reading an electronic voltage from a mass flow sensor 114 in the engine 102 fluid intake, and converting the electronic voltage to a fluid mass flow 216 value.

The energy balance module 204 may be configured to determine a first fluid enthalpy value 218 upstream 220A (refer to FIG. 1) of the first catalytic component 118. The energy balance module 204 may be further configured to determine a second fluid enthalpy value 218 upstream 220B of the second catalytic component 120, and a third fluid enthalpy value 218 downstream 220C of the second catalytic component 120. In one embodiment, each fluid enthalpy value 218 comprises the relative energy state of fluid within the exhaust conduit 110 at each location 220A, 220B, 220C relative to a baseline temperature. For example, the controller 122 may use a baseline temperature of zero degrees Celsius, survey the temperature values 116C, 116A, 116B corresponding to each location 220A, 220B, 220C. The energy balance module 204 may be configured to use the average heat capacity of the fluid and the fluid mass flow 216 value to determine the plurality of enthalpy values 218 corresponding to the locations 220A, 220B, 220C. In another embodiment, the controller 122 may use a baseline temperature of the lowest temperature of the surveyed temperature values 116C, 116A, 116B, wherein the lowest temperature location 220A, 220B, 220C within the exhaust fluid conduit 110 would then have a zero enthalpy.

The fueling module 206 may be configured to interpret a total catalyst fuel available 224. The total catalyst fuel available 224 is the amount of unburned hydrocarbon available in the exhaust fluid conduit 110 available for combustion and/or oxidation on one or more catalytic components 118, 120. The fueling module 206 may interpret the total catalyst fuel available 224 by reading values from a datalink, from sensors, or receiving data from the engine 102. In one embodiment, the fueling module 206 receives a signal from the engine 102 indicating a very-late-post-injection amount of fuel added to the exhaust stream, and a signal indicating the amount of fuel added by the dosing injector 106. The fueling module 206 may further process the total catalyst fuel available 224, for example the fueling module 206 may be configured to determine an amount of the unburned hydrocarbon that may not evaporate completely in the exhaust fluid conduit 110 and therefore that may be unavailable for combustion and/or oxidation on one or more catalytic components 118, 120.

The catalyst efficiency module 208 may be configured to determine a first catalyst fuel combustion efficiency 236 based on the temperature rise across the first catalytic component 228, and the total catalyst fuel available 224. The catalytic component temperature rise 228 may be initialized to some standard value upon the first execution cycle of the controller 122. The first catalyst fuel combustion efficiency 236 is the efficiency of the target catalytic component 118, 120 for which the current bed temperature 230 is to be determined. In the example of FIG. 1, where the upstream catalytic component 120 is a DOC, where the downstream catalytic component 118 is a NAC, and wherein the catalyst bed temperature to be determined is the NAC 118 bed temperature, the first catalyst fuel combustion efficiency 236 refers to the amount of fuel burned in the NAC 118 divided by the amount of unburned fuel entering the NAC 120.

The catalytic efficiency module 208 may be further configured to determine a second catalyst fuel combustion efficiency 226 based on the second and third fluid enthalpy values 218, and to calculate an intermediate catalyst fuel available 236 based the total catalyst fuel available 224 and the second catalyst 120 fuel combustion efficiency 226.

In one embodiment, the first catalyst fuel combustion efficiency 236 is highly dependent upon the temperature rise across the catalytic component 120, and a simple lookup table is utilized to determine the first catalyst fuel combustion efficiency 236 based on the catalytic component temperature rise 228 across the catalytic component 118. Such a lookup table is readily constructed by one of skill in the art by operating the catalytic component 118 temperature at several different values of catalytic component temperature rise 228 and determining the first catalyst fuel combustion efficiency 236 at each point. For example, the catalytic component may be expected to operate between about 5 degrees C. and 50 degrees C. temperature rise, occurring with about 5 cc/min to 100 cc/min unburned hydrocarbon entering the catalytic component 118. The lookup table may be constructed by checking the fuel combustion efficiency 236 at each 5 cc/min mark between 5 cc/min to 100 cc/min, inclusive, and plotting each resulting temperature rise 228 with the resulting first catalyst fuel combustion efficiency 236 values.

In some applications, the required temperature tolerances for the current bed temperature 230 and/or the slow response of a given temperature sensor 116 may require additional accuracy for the fuel combustion efficiency 226 beyond the lookup table based on temperature rise 228. For example, if the physical demands of the system 100 dictate that the current bed temperature may not exceed a design value for more than 5 seconds, but the response time of the temperature sensors 116 for the system 100 are 10 seconds, then additional accuracy and responsiveness for the system 100 is indicated. In one embodiment, the catalyst efficiency module 208 is further configured determine the catalyst fuel combustion efficiency 226 based on a derivative of the temperature rise across the catalytic component 228 with respect to time. The catalyst efficiency module 208 may be configured to receive a derivative of the temperature rise across the catalytic component 228 with respect to time from the controller 122, or to calculate the derivative from the values of the temperature rise across the catalytic component 228.

In one embodiment, the catalyst efficiency module 208 utilizes a two-dimensional lookup table to determine the first catalyst fuel combustion efficiency 236 based on the temperature rise across the catalytic component 228 and the time derivative of the temperature rise across the catalytic component 228. One of skill in the art can readily construct this table using the catalytic component 120 and the temperature sensor (s) 116 of the final system 100 design.

For example, a dataset is collected including a measure of the first catalyst fuel combustion efficiency 226—typically measured from a true catalyst bed temperature measurement available for design purposes, but not commercially available for the final system 100, and/or from an exhaust gas compositional analysis upstream and downstream of the catalytic component 118. The catalytic component 118 is swept through the relevant unburned hydrocarbon rates (e.g. from 5 cc/min to 100 cc/min) at designed rate, and first catalyst fuel combustion efficiency 226 is mapped for each (temperature-rise, Δ-temperature-rise/Δt) point on the two-dimensional table. One of skill in the art will be familiar with the operating range of a particular embodiment of the system 100—for example, the catalytic component 118 may have a physical limitation of increasing temperature at only 2.0 deg C./second, and the unburned hydrocarbon sweep rates may be limited such that the 2.0 deg C./second heating rate limitation of the catalytic component 118 is not exceeded. The heating rates and ranges that a particular catalytic component 118 will experience in an embodiment of the system 100 will be known to one of skill in the art given the intended components, and intended application, for the system 100.

The catalyst combustion module 210 may be configured to calculate a net heat generation 232 within the first catalytic component 118 based on the plurality of fluid enthalpy values 218 corresponding to the plurality of axial location 220, and the total catalyst fuel available 224. In one two-catalyst embodiment, the system 100 may comprise a first catalytic component 118 which may be a NAC, and a second catalytic component 120, which may be a DOC, upstream of the first catalytic component 118. The plurality of axial locations 220 may comprise a first axial location (220A—refer to FIG. 1) upstream of the first catalytic component 118, a second axial location (220B—refer to FIG. 1) downstream of the second catalytic component 120, and a third axial location (220C—refer to FIG. 1) upstream of the second catalytic component 120. The axial locations 220 in the described two-catalyst embodiment allow the controller 122 to determine the change in enthalpy across the second catalytic component 118, and the enthalpy of the fluid entering the first catalytic component 120.

In a further two-catalyst embodiment, the catalyst combustion module 210 may be further configured to determine a second catalyst fuel combustion efficiency 226 based on the fluid enthalpy values 218 corresponding to the second 220B and third 220B axial locations 220. The catalyst combustion module 210 may be further configured to calculate an intermediate catalyst fuel available 234 based on the total catalyst fuel available 224 and the second catalyst fuel combustion efficiency 226. The catalyst combustion module 210 may be further configured to calculate the net heat generation 232 based on the intermediate catalyst fuel available 234.

The catalyst combustion module 210 may be further configured to determine the second catalyst combustion efficiency 234 based on an ambient heat loss factor 238. The ambient heat loss factor 238 comprises the heat transferred from the second catalytic component 120 to the environment. For most embodiments of the invention, a simple lookup table of ambient heat loss factor 238 versus the temperature of the second catalytic component 120 will provide acceptable accuracy for the invention. One of skill in the art can determine ambient heat loss in terms of energy per time versus the temperature of the second catalytic component 120 by collecting a few simple data points. For some embodiments, the ambient temperature and the speed of travel of a vehicle associated with the system 100 may affect the ambient heat loss factor 238 of the upstream catalytic component.

For example, where the second catalytic component 120 is located outside of the engine compartment of a vehicle, the ambient temperature may be a factor in determining the ambient heat loss factor 238. In the example, extra data points are added to create a two-dimensional lookup table for the ambient heat loss factor 238 based on the second catalytic component 120 temperature and the ambient air temperature.

In another example, where the second catalytic component 120 is located in or close to the ambient air stream for a vehicle, the vehicle speed may be a factor in determining the ambient heat loss factor 238. In the example, extra data points are added to create a three-dimensional lookup table for the ambient heat loss factor 238 based on the second catalytic component 120 temperature, the ambient air temperature, and the vehicle speed. Developing the required data points and creating the appropriate lookup tables is within the skill of one in the art based on the disclosures herein and the specific hardware layout of a given system 100. The operation of the three-dimensional lookup table for the second catalytic component 120 is simple and well within the computational capabilities of typical controllers 122 associated with modern engines 102.

The peak temperature module 212 may be configured to determine a thermal driving force 240 based on the net heat generation 232. In one embodiment, the thermal driving force 240 comprises a steady-state temperature of the first catalytic component 118, meaning the temperature which the first catalytic component 118 would achieve if the net heat generation 232 were held at a presently determined value indefinitely.

The bed temperature module 214 may be configured to calculate a current bed temperature 230 based on the thermal driving force 240, a previous bed temperature 242, and the first catalytic component 118 thermal response. The bed temperature module 214 may be configured to interpret the first catalytic component 118 thermal response as a filter time constant 244. In one embodiment, the filter time constant 244 comprises the amount of time in seconds wherein the current bed temperature 230 will move approximately 63% (i.e.: (e−1)/e) of the way from an original bed temperature 230 toward the thermal driving force 240 in consecutive execution cycles of the controller 122.

Those of skill in the art will recognize that the catalytic component temperature 228 and the previous bed temperature 242 are similar parameters and in some embodiments may be the same parameter. However, they may be separated as indicated in the embodiment illustrated in FIG. 2 because they serve different purposes as discussed herein, and by being separated they can be initialized to different values, subjected to separate error handling routines, and similar concepts understood for data handling by one of skill in the art. It is within the skill of one in the art to determine whether these parameters 228, 242 should be the same or separated parameters in a given embodiment of the invention.

For example, if the filter time constant 244 is 15 seconds, a beginning bed temperature is 100 deg C., and the thermal driving force 240 remains steady at 250 deg C., the bed temperature module 214 may be configured to move the bed temperature 230 from 100 deg C. to about 194.8 deg C. in 15 seconds along an exponentially decaying curve. Those of skill in the art will recognize the example as a first order filter with the previous bed temperature 242 as the old value, the thermal driving force 240 as the new value, and the filter time constant 244 as the first order filter time constant. Although the first order filter works well as an estimate for the catalytic component 120 thermal response, other estimates of the thermal response given an initial and final temperature are known in the art and are contemplated within the scope of the invention.

Figure 3:
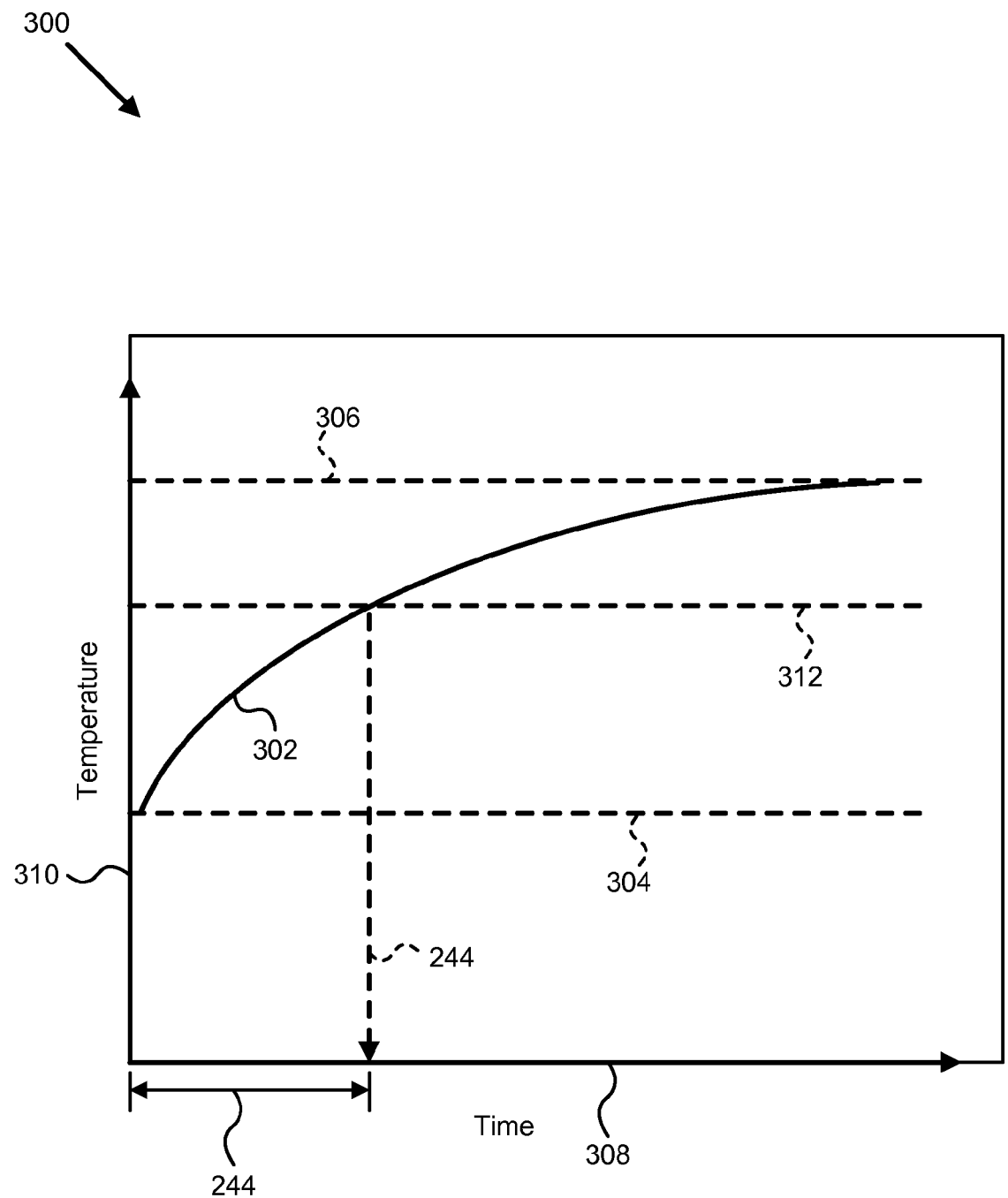
FIG. 3 is a schematic flow chart diagram illustrating one embodiment of determining a first catalytic component thermal response in accordance with the present invention.

FIG. 3 is a schematic flow chart diagram illustrating one embodiment of determining a first catalytic component thermal response 302 in accordance with the present invention. FIG. 3 illustrates one example of a dataset 300 that may be used to determine the first catalytic thermal response 302 for a given system 100. The first catalytic thermal response 302 may be interpreted as a time constant 244 as shown in the illustration of FIG. 3. The dataset 300 illustrated in FIG. 3 represents the first catalytic component thermal response 302 for a given fluid mass flow 216. A designer may take several data sets 300 for a range of fluid mass flow 216 values, and create a lookup table that returns a time constant 244 for a current fluid mass flow 216 value.

To determine the time constant 244 for an embodiment of the invention at a given fluid mass flow 216, a designer may fix the fluid mass flow 216 and the fluid flow temperature at a low temperature value of interest 304. When the first catalytic component 118 is at a steady state temperature equal to the low temperature value of interest 304, the designer may induce a step change in the fluid flow temperature to a high temperature value of interest 306, and the designer simultaneously begins plotting the catalytic thermal response 302 as a graph of time 308 versus temperature 310.

When the catalytic component temperature reaches a temperature value 312 approximately 63% (i.e. (e−1)/e) of the way from the low temperature 304 to the high temperature 306, the designer marks the rise time 314. The rise time 314 is the filter time constant 244 characterizing the present embodiment of the first catalytic component 118 at the fixed fluid mass flow 216 value. Other methods of generating the catalytic thermal response 302 are known in the art and are contemplated within the scope of the invention.

Figure 4:
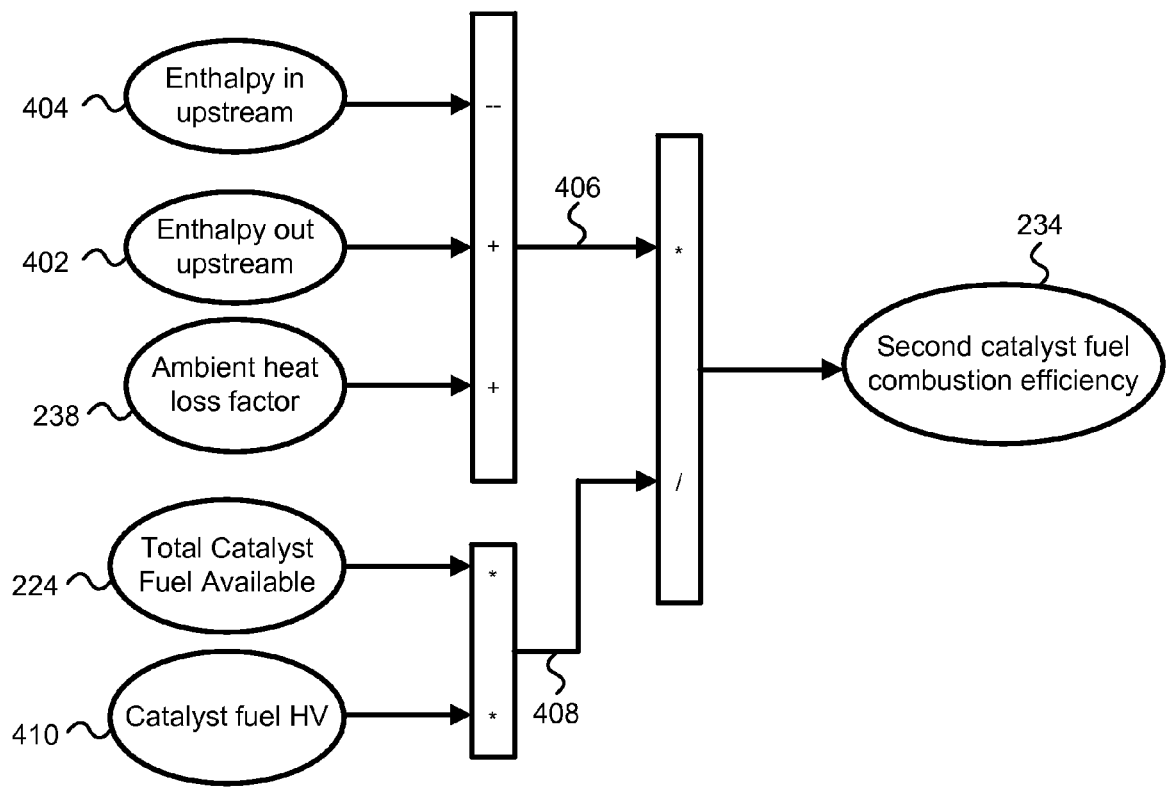
FIG. 4 is a schematic flow chart diagram illustrating one embodiment of determining a second catalyst combustion efficiency in accordance with the present invention.

FIG. 4 is a schematic flow chart diagram illustrating one embodiment of determining a second catalyst combustion efficiency 226 in accordance with the present invention. In the illustrated embodiment, the catalyst combustion module 210 calculates the difference between the enthalpy out 402 of the second catalytic component 120 and the enthalpy in 404 of the second catalytic component 120 to determine the energy rise 406 across the second catalytic component 120 attributable to fuel burned in the second catalytic component 120. As indicated in the description referencing FIG. 2, in embodiments where ambient heat losses may be significant, the catalyst combustion module 210 may add back the ambient heat loss factor 238 in determining the energy rise 406 across the second catalytic component 120 attributable to fuel burned in the second catalytic component 120.

The catalyst combustion module 210 in the embodiment of FIG. 4 calculates the total energy available from catalyst fuel 408 by multiplying the total catalyst fuel available 224 by the catalyst fuel heating value 410 in terms of energy per unit mass. The catalyst combustion module 210 may then estimate the second catalyst fuel combustion efficiency 226 by dividing the energy rise 406 across the second catalytic component 120 attributable to fuel burned in the second catalytic component 120 by the total energy available from catalyst fuel 408.

Figure 5:
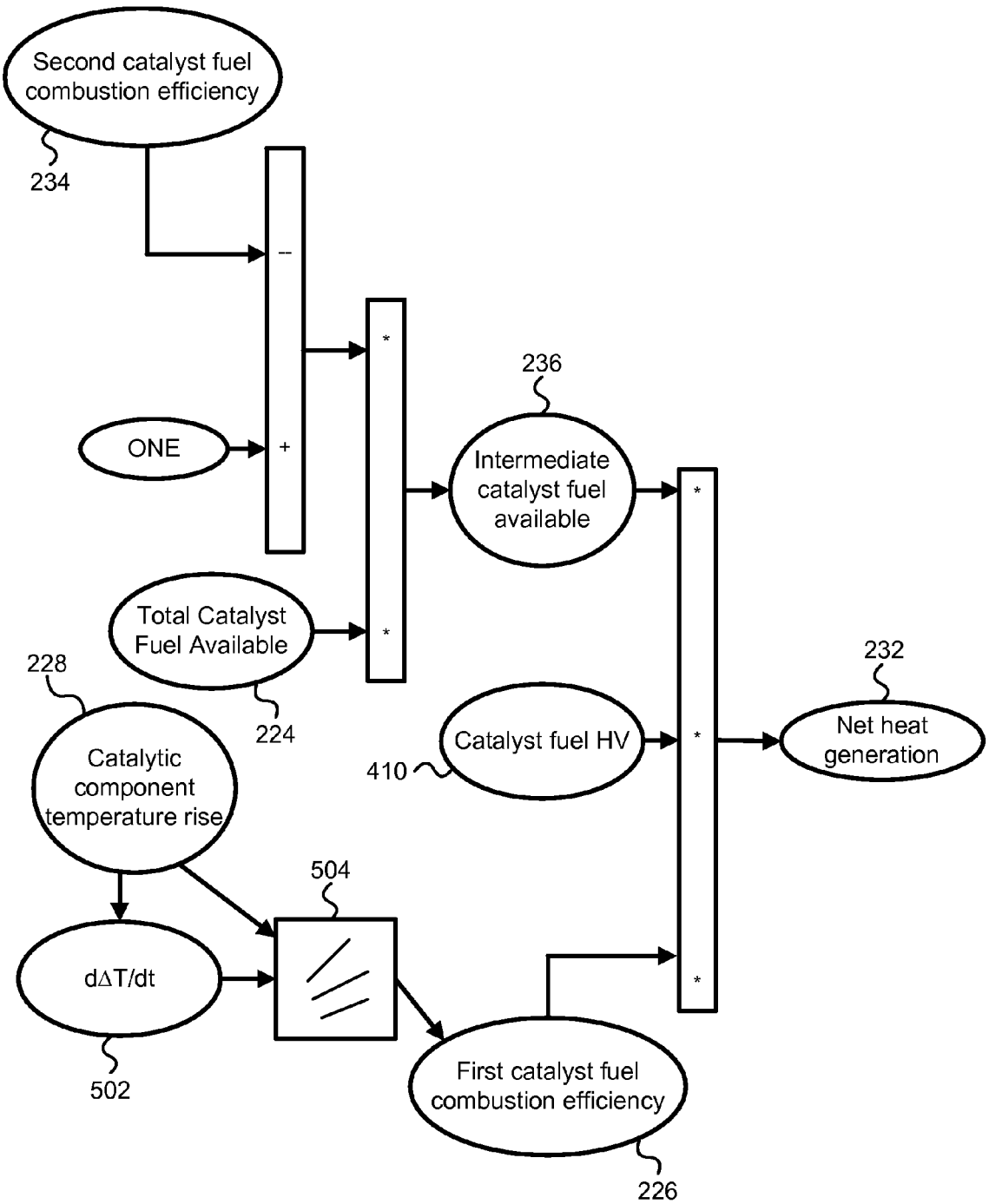
FIG. 5 is a schematic flow chart diagram illustrating one embodiment of calculating a net heat generation in accordance with the present invention.

FIG. 5 is a schematic flow chart diagram illustrating one embodiment of calculating a net heat generation 232 in accordance with the present invention. In the embodiment of FIG. 5, the catalyst combustion module 210 is configured to calculate an intermediate catalyst fuel available 234 based on the total catalyst fuel available 224 and the second catalyst fuel combustion efficiency 226 by multiplying the total catalyst fuel available 224 by the term $(1-\epsilon_2)$, where $\epsilon_2$ is the second catalyst fuel combustion efficiency 226 based on a 0-1 efficiency value.

In the embodiment of FIG. 5, the catalyst efficiency module 208 is configured to determine a first catalyst fuel combustion efficiency 236 based on the temperature rise 228 across the first catalytic component 118 and the time derivative 502 of the temperature rise 228 across the first catalytic component 118. The catalyst efficiency module 208 may utilize a two-dimensional lookup table 504 to determine the first catalyst fuel combustion efficiency 236 based on the temperature rise 228 across the first catalytic component 118 and the time derivative 502 of the temperature rise 228 across the first catalytic component 118. The catalyst combustion module 210 may be further configured to calculate the net heat generation 232 based on the intermediate catalyst fuel available 234 and the first catalyst fuel combustion efficiency 236 by multiplying the product of those values 226, 236 by the catalyst fuel heating value 410.

Figure 6:
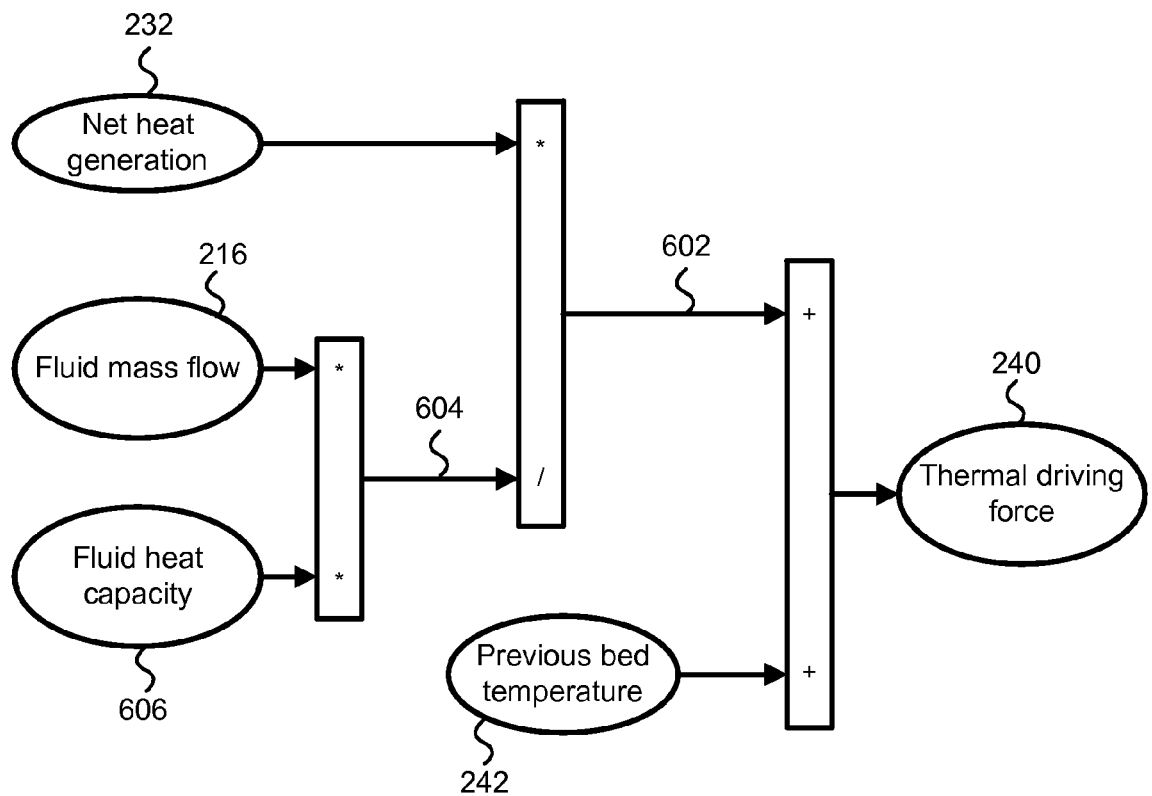
FIG. 6 is a schematic flow chart diagram illustrating one embodiment of determining a thermal driving force in accordance with the present invention.

FIG. 6 is a schematic flow chart diagram illustrating one embodiment of determining a thermal driving force 240 in accordance with the present invention. In the embodiment of FIG. 6, the peak temperature module 212 is configured to calculate a temperature rise 602 by dividing the net heat generation 232 by the thermal mass of the fluid 604. The thermal mass of the fluid 604 may be determined by multiplying the fluid mass flow 216 by the fluid heat capacity 606. The fluid heat capacity 604 may be determined according to the exhaust fluid composition, temperature, and pressure. However, in most cases an assumption of constant heat capacity and standard composition of combustion byproducts will yield acceptable results for determining the thermal driving force 240.

In one embodiment, the temperature rise 602 can be used as the thermal driving force 240. In an alternate embodiment, as shown in FIG. 6, the thermal rise 602 can be added to the current bed temperature 230—approximated by using a previous bed temperature 242 calculated from a previous execution cycle of the controller 122, or set to an initialized value—to determine the thermal driving force 240. The thermal driving force 240 illustrated in FIG. 6 comprises a steady state temperature, or the temperature that the first catalytic component 118 eventually would achieve if the net heat generation 232 and the fluid mass flow 216 were held fixed indefinitely.

Figure 7:
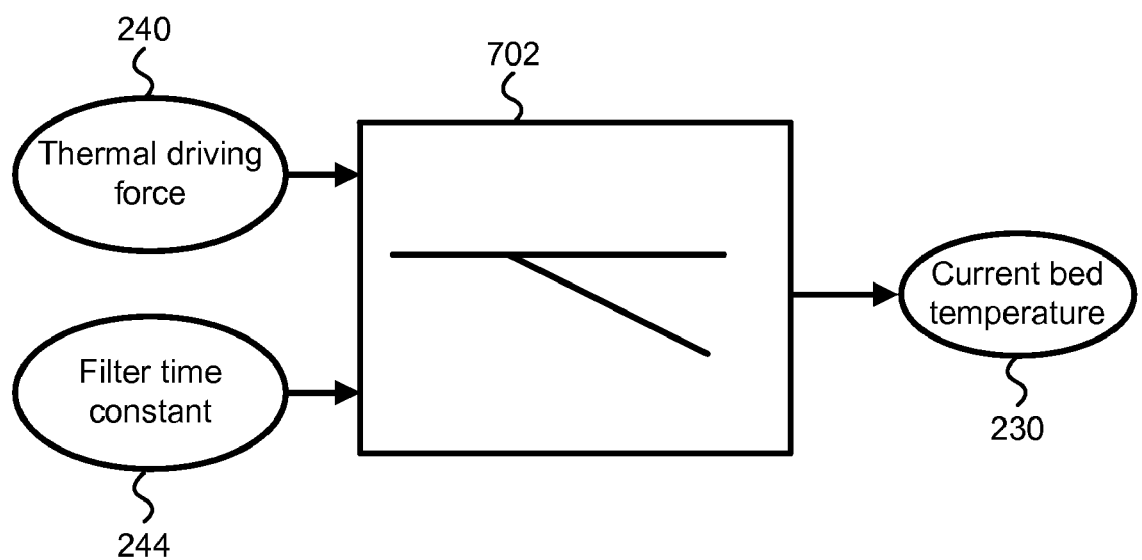
FIG. 7 is a schematic flow chart diagram illustrating one embodiment of calculating a current bed temperature in accordance with the present invention.

FIG. 7 is a schematic flow chart diagram illustrating one embodiment of calculating a current bed temperature 230 in accordance with the present invention. In the embodiment of FIG. 7, the bed temperature module 214 is configured to operate a low-pass first order filter 702 on the thermal driving force 240 with the filter time constant 244 to calculate the current bed temperature 230. The filter 702 is configured to store the previous bed temperature 242 at each execution cycle of the controller 122 for use in the subsequent execution cycle. The exact operations of the filter 702 are known in the art, and depend upon the specific controller 122—for example, the execution rate of the controller 122, and whether the controller 122 operates with fixed-point or floating point math. Most filter 702 embodiments, given a previous temperature 242 "PT", a filter time constant 244 "TAU", thermal driving force 240 "TF", and a controller 122 execution rate (not shown) "dt", will approximate Equation 1 to determine the current bed temperature 230 "TX":

$$TX = PT + (TF - PT) * \left[ \frac{e^{\frac{dt}{TAU}} - 1}{e^{\frac{dt}{TAU}}} \right]. \quad \text{Equation 1}$$

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 8:
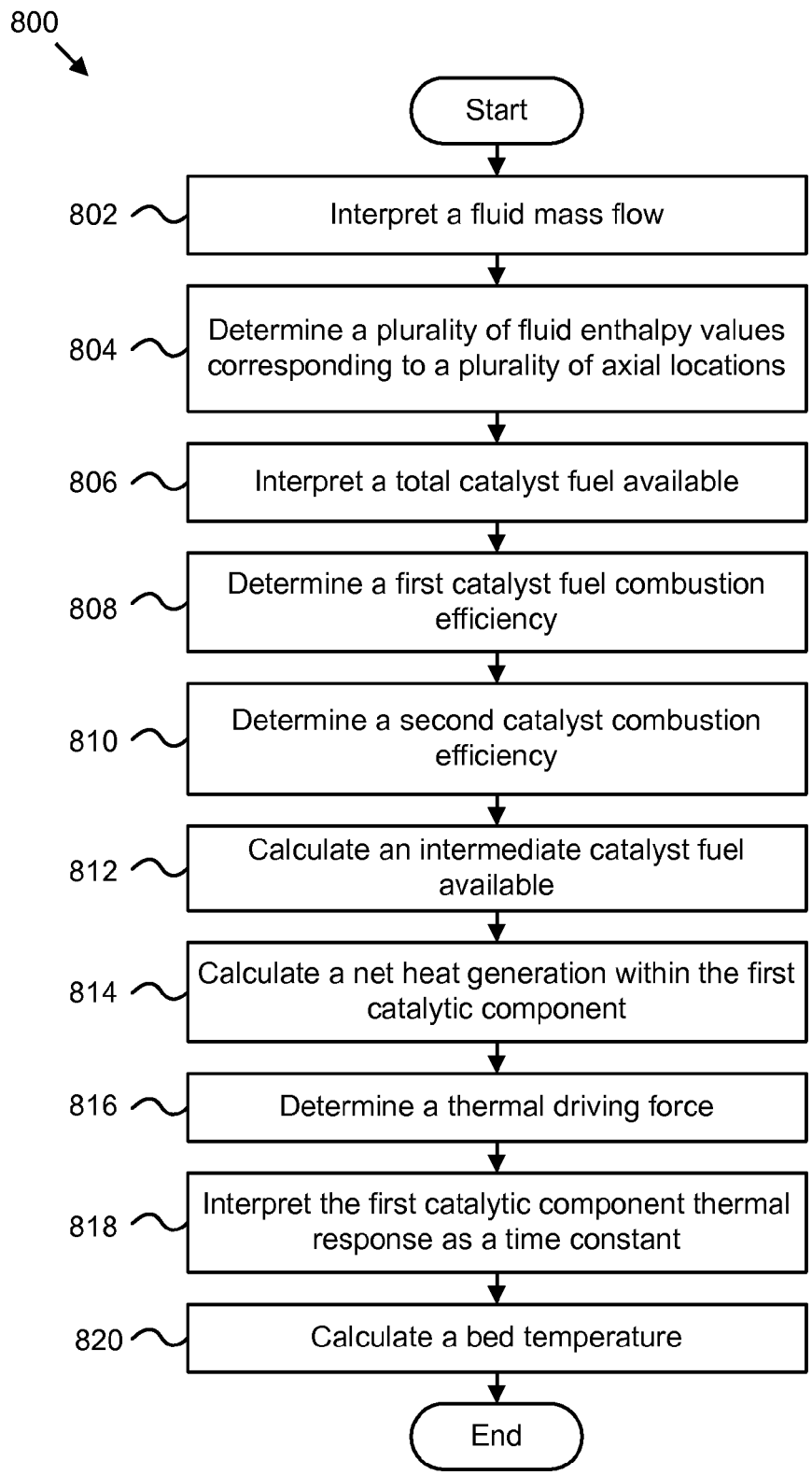
FIG. 8 is a schematic flow chart diagram illustrating one embodiment of a method for determining a catalyst bed temperature in accordance with the present invention.

FIG. 8 is a schematic flow chart diagram illustrating one embodiment of a method 800 for determining a catalyst bed temperature 130 in accordance with the present invention. The method 800 may be implemented as operations performed by a computer program product. The method 800 may begin with the mass flow module 202 interpreting 802 a fluid mass flow 216. The energy balance module 204 may determine 804 a plurality of fluid enthalpy values 218 corresponding to a plurality of axial locations 220. The method 800 may continue with the fueling module 206 interpreting 806 a total catalyst fuel available 224.

The method 800 may include the catalyst efficiency module 208 determining 808 a first catalyst fuel combustion efficiency 236. The method 800 may continue with the catalyst combustion module 210 determining 810 a second catalyst combustion efficiency 226, calculating 812 an intermediate catalyst fuel available 234, and calculating 814 a net heat generation 232 within a catalytic component 120. The method 800 may include a peak temperature module 212 determining 816 a thermal driving force 240. A bed temperature module 214 may interpret 818 a first catalytic component thermal response 302 as a filter time constant 244, and calculate 820 a bed temperature 230 based on the thermal driving force 240, a previous bed temperature 242, and the filter time constant 244.

Figure 9:
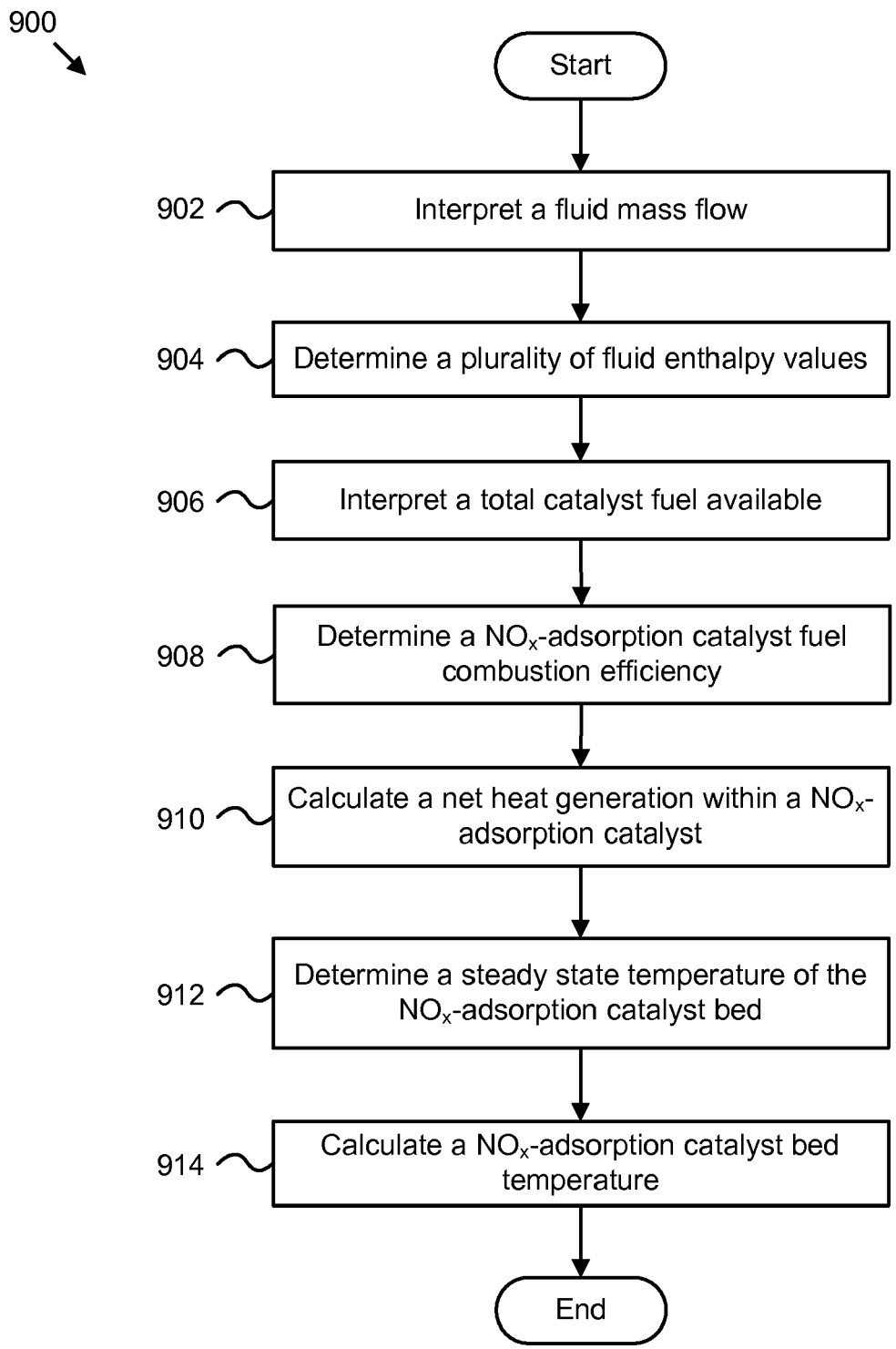
FIG. 9 is a schematic flow chart diagram illustrating an alternate embodiment of a method for determining a catalyst bed temperature in accordance with the present invention.

FIG. 9 is a schematic flow chart diagram illustrating an alternate embodiment of a method 900 for determining a catalyst bed temperature in accordance with the present invention. The method 900 may be implemented as operations performed by a computer program product. The method 900 may begin with the mass flow module 202 interpreting 902 a fluid mass flow 216 within an exhaust fluid conduit 110. An energy balance module 204 may determine 904 a plurality of fluid enthalpy values 218, each fluid enthalpy value corresponding to one of the following axial locations 220 within the exhaust fluid conduit: upstream 220A of a $NO_x$-adsorption catalyst 118, upstream 220B of a diesel oxidation catalyst 120, and downstream 220C of the diesel oxidation catalyst 120. The method 900 may continue with a fueling module 206 interpreting 906 a total catalyst fuel available 224.

The method 900 may include the catalyst combustion module 210 calculating 910 a net heat generation 232 within the NOx-adsorption catalyst 118 based on the plurality of fluid enthalpy values 218 by: determining a combustion efficiency 234 for the diesel oxidation catalyst 120 based on the fluid enthalpy values 218 upstream and downstream of the diesel oxidation catalyst 120, calculating an intermediate catalyst fuel available 234 based on the total catalyst fuel available 224 and the second combustion efficiency 226 for the diesel oxidation catalyst 118, and calculating the net heat generation 232 based on the intermediate catalyst fuel available 234. In one embodiment, determining a second combustion efficiency 226 for the diesel oxidation catalyst 120 comprises interpreting an enthalpy rise 406 across the diesel oxidation catalyst 120, determining a fuel quantity required to induce the enthalpy rise 406, and comparing the fuel quantity to the total catalyst fuel available 224 (see the description referencing FIG. 4).

Calculating 910 a net heat generation 232 within the NOx-adsorption catalyst 118 may further include a first catalyst efficiency module 208 determining a first catalyst fuel combustion efficiency 236, wherein the first catalyst fuel combustion efficiency 236 comprises a function 504 of the temperature rise 228 across the NOx-adsorption catalyst 118, and a derivative 502 of the temperature rise across the NOx-adsorption catalyst 228, and basing the net heat generation 232 on the first catalyst fuel combustion efficiency 236. In one embodiment, acceptable accuracy for calculating the net heat generation 232 by the catalyst combustion module 210 is achieved without determining a first catalyst combustion efficiency 236—for example by assuming a nominal first catalyst combustion efficiency 236 of 80%.

The method 900 may continue with a peak temperature module 212 determining 912 a steady state temperature 240, or thermal driving force 240, of the NOx-adsorption catalyst 118 bed based on the net heat generation 232 within the NOx-adsorption catalyst 118, and a bed temperature module 214 calculating 914 a NOx-adsorption catalyst bed temperature 230 based on the steady state temperature 240, a previous bed temperature 242, and the NOx-adsorption catalyst thermal response 302 (see the description referencing FIG. 6).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for determining a catalyst bed temperature, the apparatus comprising:
    an energy balance module configured to determine a first fluid enthalpy value of a fluid upstream of a first catalytic component;
    a fueling module configured to determine an amount of unburned hydrocarbons in the fluid available for combustion on the first catalytic component;
    a catalyst combustion module configured to calculate a net heat generation within the first catalytic component based on the amount of unburned hydrocarbons in the fluid available for combustion on the first catalytic component and the first fluid enthalpy value, the catalyst combustion module being communicable in data receiving communication with the energy balance module and fueling module;
    a peak temperature module configured to determine a thermal driving force based on the net heat generation, the peak temperature module being communicable in data receiving communication with the catalyst combustion module; and
    a bed temperature module configured to calculate a current bed temperature of the first catalytic component based on the thermal driving force, a previous bed temperature of the first catalytic component, and a predicted time constant of the thermal response of the first catalytic component, the bed temperature module being communicable in data receiving communication with the peak temperature module.

2. The apparatus of claim 1, wherein the energy balance module is further configured to determine a second fluid enthalpy value upstream of a second catalytic component, and a third fluid enthalpy value downstream of the second catalytic component, and wherein the catalyst combustion module is further configured to calculate the net heat generation based on the second and third fluid enthalpy values, wherein the first catalytic component is disposed in the exhaust fluid conduit downstream of the second catalytic component.

3. The apparatus of claim 2, further comprising a catalyst efficiency module configured to determine a first catalyst fuel combustion efficiency based on a temperature rise across the first catalytic component, wherein the catalyst combustion module is further configured to calculate the net heat generation based on the first catalyst fuel combustion efficiency.

4. The apparatus of claim 3, wherein the catalyst efficiency module is further configured to determine the first catalyst fuel combustion efficiency based on a derivative of the temperature rise across the first catalytic component with respect to time.

5. The apparatus of claim 2, further comprising a catalyst efficiency module configured to determine a second catalyst fuel combustion efficiency based on the second and third fluid enthalpy values, and wherein the catalyst combustion module is further configured to calculate an intermediate amount of unburned hydrocarbons in the fluid downstream of the second catalytic component available for combustion on the first catalytic component based on the amount of unburned hydrocarbons in the fluid available for combustion on the first catalytic component and the second catalyst combustion efficiency, and to calculate the net heat generation based on the intermediate amount of unburned hydrocarbons in the fluid downstream of the second catalytic component available for combustion on the first catalytic component.

6. The apparatus of claim 5, wherein the catalyst efficiency module is further configured to determine a first catalyst fuel combustion efficiency based on the temperature rise across the first catalytic component, and wherein the catalyst combustion module is further configured to calculate the net heat generation based on the first catalyst fuel combustion efficiency.

7. The apparatus of claim 6, wherein the catalyst efficiency module is further configured to determine the first catalyst fuel combustion efficiency based on a derivative of the temperature rise across the first catalytic component with respect to time.

8. The apparatus of claim 5, wherein the catalyst efficiency module is further configured to determine the second catalyst combustion efficiency based on a second catalytic component ambient heat loss factor.

9. The apparatus of claim 4, wherein the first catalytic component comprises a $NO_x$ adsorption catalyst, and wherein the second catalytic component comprises a diesel oxidation catalyst.

10. The apparatus of claim 2, wherein the thermal driving force comprises a steady-state temperature, and wherein the bed temperature module is further configured to operate a first-order filter to calculate a current bed temperature based on the steady-state temperature, the previous bed temperature, and the filter time constant.

11. A method for determining a catalyst bed temperature, the method comprising:
    determining a first fluid enthalpy value upstream of a first catalyst, a second fluid enthalpy value upstream of a second catalyst, and a third fluid enthalpy value downstream of the second catalyst, wherein the first catalyst is disposed in the exhaust fluid conduit downstream of the second catalyst;
    determining an amount of unburned hydrocarbons in a fluid upstream of the second catalyst that is available for combustion on the first catalyst and second catalyst;
    determining a combustion efficiency for the second catalyst based on the second and third fluid enthalpy values;
    calculating an amount of unburned hydrocarbons in the fluid downstream of the second catalyst that is available for combustion on the first catalyst based on the amount of unburned hydrocarbons in a fluid upstream of the second catalyst that is available for combustion on the first catalyst and second catalyst and the combustion efficiency for the second catalyst and;
    calculating the net heat generation within the first catalyst based on the amount of unburned hydrocarbons in the fluid downstream of the second catalyst that is available for combustion on the first catalyst and the first fluid enthalpy value;
    determining a steady state temperature of the first catalyst bed based on the net heat generation; and calculating a first catalyst bed temperature based on the steady state temperature, a previous bed temperature, and a predicted time constant of the thermal response of the first catalyst.

12. The method of claim 11 wherein the amount of unburned hydrocarbons in a fluid upstream of the second catalyst that is available for combustion on the first catalyst and second catalyst comprises at least one member selected from the group consisting of an amount of unburned fuel provided by the engine in a very late post injection, and an amount of unburned fuel provided by a fuel doser in fluid communication with an exhaust pipe.

13. The method of claim 11, wherein determining a combustion efficiency for the second catalyst comprises interpreting an enthalpy rise across the second catalyst, determining a fuel quantity required to induce the enthalpy rise, and comparing the fuel quantity to the amount of unburned hydrocarbons in a fluid upstream of the second catalyst that is available for combustion on the first catalyst and second catalyst.

14. The method of claim 11, wherein calculating the net heat generation comprises determining a combustion efficiency for the first catalyst, wherein the combustion efficiency for the first catalyst comprises a function of the temperature rise across the first catalyst, and a derivative of the temperature rise across the first catalyst with respect to time.

15. An exhaust aftertreatment system for treating exhaust gas generated by an internal combustion engine, comprising:
an exhaust fluid conduit configured to vent exhaust gas generated by an internal combustion engine;
a first catalytic component configured to treat exhaust gas within the exhaust fluid conduit;
a controller comprising:
an energy balance module configured to determine a plurality of exhaust fluid enthalpy values each corresponding to one of a plurality of axial locations along the exhaust fluid conduit;
a fueling module configured to determine an amount of unburned hydrocarbons in the exhaust fluid available for combustion on the first catalytic component;
a catalyst combustion module configured to calculate a net heat generation within the first catalytic component based on the amount of unburned hydrocarbons in the exhaust fluid available for combustion on the first catalytic component and the plurality of exhaust fluid enthalpy values, the catalyst combustion module being communicable in data receiving communication with the energy balance module and fueling module;
a peak temperature module configured to determine a thermal driving force based on the net heat generation, the peak temperature module being communicable in data receiving communication with the catalyst combustion module; and
a bed temperature module configured to calculate a bed temperature of the first catalytic component based on the thermal driving force, a previous bed temperature of the first catalytic component, and a predicted time constant of the thermal response of the first catalytic component, the bed temperature module being communicable in data receiving communication with the peak temperature module.

16. The system of claim 15, further comprising a second catalytic component configured to treat the engine exhaust, wherein the energy balance module is further configured to determine a second fluid enthalpy value upstream of the second catalytic component, and a third fluid enthalpy value downstream of the second catalytic component, and wherein the catalyst combustion module is further configured to calculate the net heat generation based on the second and third fluid enthalpy values, wherein the first catalytic component is disposed in the exhaust fluid conduit downstream of the second catalytic component.

17. The apparatus of claim 16, further comprising a catalyst efficiency module configured to determine a first catalyst fuel combustion efficiency based on a temperature rise across the first catalytic component, wherein the catalyst combustion module is further configured to calculate the net heat generation based on the first catalyst fuel combustion efficiency.

18. The apparatus of claim 17, wherein the catalyst efficiency module is further configured to determine the first catalyst fuel combustion efficiency based on a derivative of the temperature rise across the first catalytic component with respect to time.

* * * * *